United States Patent Office 2,880,718
Patented Apr. 7, 1959

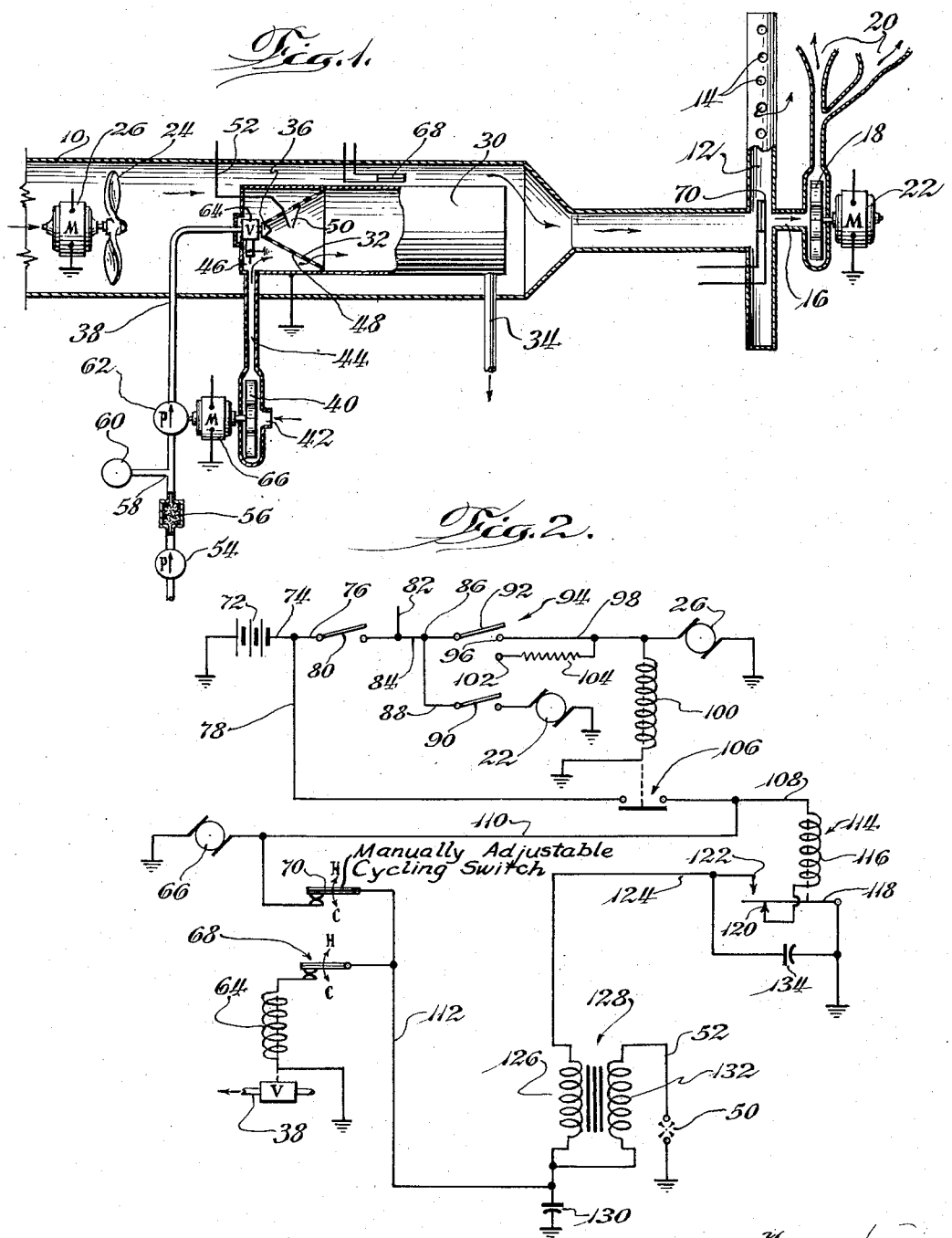

2,880,718

AUTOMOTIVE VEHICLE HEATING SYSTEM

Frank A. Ryder, Indianapolis, Ind., assignor to Stewart-Warner Corporation, Chicago, Ill., a corporation of Virginia Application August 5, 1955, Serial No. 526,714

5 Claims. (Cl. 126—116)

The present invention relates to vehicle heating systems in which the source of heat is combustion of a fuel and air mixture.

It is one of the objects of the present invention to provide a well integrated heating system of the combustion type for an automotive vehicle which has important and novel virtues not ordinarily associated with heating equipment of this type.

More specifically, it is an object of my invention to provide a heating system for an automobile or similar vehicle of the combustion type which has all of the following virtues, among others:

It completely satisfies all heating requirements and operates to provide heated air with very close regulation at any desired pre-set temperature regardless of the ambient temperature or the rate at which the automotive vehicle is moving;

It can easily be made so as to be completely interchangeable with more conventional hot water heating systems with much of the equipment being common to both systems. For instance, the supply of ventilating air to the heat exchanger is not critical, thereby making it possible to use the ventilating air blower and the major portion of the duct work which have been designed for use with a hot water heater system, substantially without change when making a substitution;

Unlike most combustion heaters intended for use in automobiles, no purge cycle is necessary. This makes it possible to switch off the heater along with the engine ignition and immediately leave the vehicle without the necessity for the ventilating air blower and the combustion air blower continuing in operation to purge the combustion system;

The heating system operates without any connection to the vehicle internal combustion engine intake manifold, exhaust manifold, carburetor or ignition systems;

The heater comes into operation instantly upon operation of an appropriate control switch and supplies warm air to the space to be heated within a matter of a few seconds;

A change in the setting of the air temperature thermostat brings about an almost immediate response in the temperature of the air delivered to the space to be heated, thereby enabling a person occupying the heated space to quickly arrive at an appropriate adjustment of the thermostatic controls; and Interference with radio operation in the vehicle is made almost nonexistent without the introduction of the usual complications.

An additional object is to accomplish all of the above and other worth-while features at a minimum of cost and complexity so as to enable a heating system of this character to have a wide appeal to prospective purchasers.

Other objects and advantages will become apparent from the following description of a preferred embodiment of my invention which is illustrated in the accompanying drawings.

Heating systems of the character now largely employed for automotive vehicles heat the ventilating air by passing it through a heat exchanger in heat exchange relation to hot water taken from the automobile engine cooling system.

Several well known but sometimes not generally appreciated disadvantages are associated with this approach to the heating problem. They are essentially as follows:

(1) It is difficult to obtain sufficient heat from a heating system of this character when the ambient temperature is quite low and the vehicle is traveling at a comparatively high rate of speed. This is because the heat lost from the vehicle passenger compartment under these conditions is quite great and almost always beyond the capacity of a hot water heating system of feasible size;

(2) It is almost impossible to obtain sufficient heat for the passenger compartment under conditions where the ambient temperature is low and the vehicle is traveling at a low rate of speed or idling frequently as occurs when the vehicle is being driven in city traffic, or when it is parked. The reason for this is that when the engine is idling, or operating at a low rate of speed, the engine water pump does not circulate the engine cooling medium sufficiently rapidly to satisfy the heat load;

(3) Because the cooling medium in the internal combustion engine heats to a satisfactory temperature slowly, little or no heat is available from a hot water heating system of the conventional type until the vehicle has been driven a considerable distance. Although this disadvantage is always noticeable, it is particularly apparent where the vehicle is used for short trips under conditions where the vehicle may arrive at its destination before the temperature of the water has reached a satisfactory level for heater operation;

(4) Usually, satisfactory operation of a hot water heating system requires that a high temperature thermostating be used in the engine cooling system so as to insure sufficient heat being supplied to the heat exchanger. This in turn usually requires the use of an antifreeze of the permanent type. Antifreeze solutions or mixtures having these characteristics are ordinarily quite expensive and have certain disadvantages associated with their use, such as the danger of causing expensive engine damage if the antifreeze mixture leaks into the engine cylinders by way of a faulty gasket between the cylinder block and cylinder heads as an example.

The heating system of the present invention operates entirely independently of the automotive vehicle engine, excepting that it is preferred, as will appear presently, to tap into the automobile fuel line between the engine carburetor and the engine driven or electrically operated fuel pump which supplies the engine. This has no influence whatever upon engine operation, since the fuel requirements of a heating system of the present character are extremely small as compared with those of the engine.

In the drawings, in which similar characters of reference indicate similar parts throughout, Figure 1 is a diagrammatic representation of the mechanical aspects of an automobile heating system embodying features of the present invention; and Fig. 2 is an electrical circuit diagram thereof.

Referring to Fig. 1 of the drawings, I have indicated a duct at 10 which is connected to a source of ventilating air preferably initially taken from outside the vehicle. Commonly this comprises a ram type inlet positioned alongside the radiator of the vehicle and facing forwardly, or a scoop at the top of the cowl, either of which is connected to bring outside air into the vehicle and direct it into the engine compartment to the heater inlet duct 10. The opposite end of the duct 10 leads to the space to be heated and commonly takes the form of a transverse tube or plenum chamber 12, which extends across the fire wall on the passenger side thereof and has appropriate slots or other outlets within the space to be heated. In Fig. 1 of the drawings such outlet openings are indicated by the numeral 14. The plenum chamber 12 is also connected as by a branch 16 to the inlet of a blower 18, the outlet of which is connected to defroster openings 20 positioned usually just inside the windshield at the lower edge thereof. The defroster blower 18 is shown as being driven by an electric motor 22. Somewhere within the duct 10, or the duct work leading thereto, a ventilating air blower 24, driven by an electric motor 26, is located so that when the motor 26 is energized, air will be caused to flow through the casing 10 and into the plenum chamber 12.

Within the casing 10 I have shown a heat exchanger 30 having a perforated burner cone 32 near one end and an exhaust outlet connection 34 at the other. The heat exchanger 30 is so placed that air flowing through the duct 10 is brought into heat exchange relationship thereto and is thus raised to a desirable temperature as will appear.

At the apex of the burner cone 32 the heater is provided with a spray nozzle 36 supplied with fuel by way of a fuel line 38. Air for combustion is supplied by a blower 40 which takes air into a blower housing through an atmospheric inlet 42 and forces it through a combustion air tube 44 to a plenum chamber 46 which encloses the back of the burner cone 32, so that air entering the plenum chamber 46 passes into the combustion space by way of perforations 48 appropriately formed through the wall of the cone. Within the burner cone, there are a pair of fuel igniting sparking electrodes 50, one of which is grounded while the other is connected to a lead 52 energized as will be discussed presently.

Fuel, ordinarily gasoline, is taken from the fuel tank of the automotive vehicle through the engine fuel pump 54 and thence is passed through a filter 56 to a T fitting 58 one branch of which is connected to supply the float bowl of the engine carburetor indicated at 60, while the other branch is connected to the intake side of a heater fuel pump 62. The output of the fuel pump 62 is connected through an electrically actuated on-off valve 64 to the previously mentioned fuel line 38. For a reason to appear presently, the valve 64 should be placed as close as possible to the nozzle 36.

The engine fuel pump 54 it is anticipated will be supplied with the vehicle and ordinarily supplies fuel on its output side at a pressure of from three to five pounds per square inch. Such pumps usually are driven from the cam shaft of the automobile engine. There are, however, pumps for the same purpose which are electrically operated, and it will be appreciated that so far as the present invention is concerned whether the pump at 54 is cam shaft actuated or electrically driven is a matter of no consequence. The pump at 62 is preferably of the substantially constant pressure variable delivery type and may have an output pressure to the fuel nozzle 36 of something of the order of 25 pounds per square inch. It may, however, be less than this if desired. As shown, a single motor at 66 drives both the combustion air blower 40 and the fuel pump 52.

A thermostatic switch indicated at 68 is placed in close association with the surface of the heat exchanger 30 and is of the normally closed type. During ordinary operation of the heater the switch 68 remains closed, but will be sufficiently heated by conduction, by radiation or by both, depending upon the type of switch used, so as to open in the event that the surface of the heat exchanger 30 becomes hot enough to indicate a malfunctioning of the heater, such for instance as a failure in the supply of ventilating air. The switch 68, therefore, serves as a safety overheat switch. A second thermostatic switch 70 is shown as being located within the plenum chamber 12 close to the connection between the plenum chamber and the duct 10. It is therefore subjected to the temperature of the ventilating air flowing into the plenum chamber 12. This thermostat 70 is of the normally closed manually adjustable type and is under the control of the occupant of the space to be heated, so that the point at which the contacts separate may be easily set so as to be anywhere within the range of say 60° F. to 250° F. Switch 70 will frequently hereafter be referred to as a cycling switch.

From the above description of the mechanical organization of the heating system, it will be appreciated that if the heat exchanger 30 and the equipment directly associated therewith are removed from the duct 10 and replaced by a liquid to air heat exchanger of the type ordinarily used in a hot water heating system, the system will function as a hot water heater. Thus it is possible to supply substantially all of the duct work 10, the air inlet system thereto, the plenum chamber 12, the defroster blower and ducts leading to the outlets 20 and the ventilating air blower 26—24 in an automobile and then, depending upon the customer's option, to install either a hot water heat exchanger core and the mechanism associated with the heat exchanger core or the mechanism associated with the heat exchanger 30.

The heating system and mechanism of the present invention greatly facilitates this substitution because, as will appear presently, the rate of air flow through the duct 10 is not critical, since the heat output from the burner to the heat exchanger 30 is automatically adjusted without attention from the occupant to the rate of ventilating air flow. The ventilating air system can, therefore, be designed to fit the requirements of the optional hot water system.

Referring now to Fig. 2 of the drawings, the automobile battery is indicated at 72. One end of this battery is grounded while the other end is connected to a lead 74 having branches 76 and 78. The branch 76 leads through the engine ignition switch 80 to a lead having a branch 82 for energizing the automobile engine ignition system, and a branch 84 connected to a terminal 86. This terminal is connected by a lead 88 to the motor 22 for operating the defroster blower 18, the motor having a switch 90 in series therewith for turning the defroster blower on or off.

The terminal 86 is also connected to the movable member 92 of a three-position heater switch indicated generally by the numeral 94. In the position shown, the switch member 92 makes no contact and this is the off position for the heating system. In another position indicated at 96 a circuit is made through the switch 94 to a lead 98 connected to the motor 26 and to one end of a relay coil 100. The other terminals of the motor 26 and relay coil 100 are grounded and thus, whenever the switch 94 energizes contact 96 and the ignition switch 80 is closed, both the motor 26 and the relay coil 100 will be energized.

The second contact 102 of the switch 94 is connected through a fixed resistor 104 to the lead 98 so that when the movable switch member 92 is associated with contact 102 the motor 26 will be energized by way of the resistor 104 and therefore will run at a lower speed. Under these conditions the relay coil 100 still receives sufficient energization to close relay contacts 106 associated therewith. The normally open relay contacts 106 are connected between the previously mentioned lead 78 and a lead indicated at 108.

The lead 108 is connected by a branch 110 to ground through the motor 66 which drives the fuel pump 62 and the combustion air blower 40. This branch 110 is also connected through the contacts of the cycling thermostatic switch 70 to a lead 112 which is connected in turn through the normally closed overheat thermostatic switch 68 to one end of the coil of the on-off valve 64 the other end of which is grounded. This valve is of the type which is normally closed when deenergized and which opens to permit fuel flow therethrough when energized.

A vibrating reed type circuit interrupter is indicated generally at 114 and consists of a coil 116 in position to attract a vibrating tuned reed 118 which in the deenergized position makes a circuit through a contact 120. The lead 108 is connected to one end of the coil 116 while the other end is connected to the contact 120 and thence, by way of the reed 118, to ground. Energizing the lead 108, therefore, causes vibration of the reed 118. The reed in vibrating comes into contact during each cycle with a normally open contact 122 which is connected by way of a lead 124 to one end of the primary 126 of a step-up ignition transformer indicated generally by the numeral 128, the other end of this primary being connected to the previously mentioned lead 112. This end of the primary is also connected to ground through a capacitor 130 and to one end of the transformer secondary 132. The other end of this secondary is connected to the high tension spark plug lead 52 previously mentioned. A capacitor 134 is connected between ground and the vibrator contact 122.

Capacitors 130 and 134 are principally for contact protection and for improvement of the performance of the transformer 128. They also reduce radio interference which might otherwise be produced by the making and breaking of the inductive circuits during heater operation.

The above described heating system operates in the following manner:

When at rest, relay coil 100 will be deenergized, and therefore contacts 106 will be open. Upon closure of the ignition switch 80, so as to energize the lead 82 to the ignition system of the automobile engine and upon starting of the engine, no heater circuits are energized so long as the switch 92 and the switch 90 are in the positions shown. Now if it is assumed that heater switch blade 92 is moved to contact 96, the ventilating air blower motor 26 will be energized as will relay coil 100. Relay contacts 106 thereby close and energize the vibrating mechanism comprised of the coil 116, the contact 120 and the reed 118.

Simultaneously the electric motor 66 will be energized by way of lead 110 thereby placing the combustion air blower and the fuel pump in operation. If the temperature is low, as will usually be the case when the heater is started, the thermostatic cycling switch 70 will be closed thereby energizing lead 112. This in turn energizes the fuel valve 64 by way of the closed overheat switch 68. The valve is, therefore, opened and fuel under pressure is supplied to the line 38. Simultaneously, lead 112 energizes the primary 126 of the transformer intermittently by way of lead 124, contact 122 and the vibrating reed 118.

Under these conditions sparking will take place within the burner and fuel under pressure will be supplied to the nozzle 36. Inasmuch as combustion air is also being supplied by the blower 40, ignition within the burner will take place substantially instantaneously, and since ventilating air is being supplied by the fan or blower 24, warm air will be distributed through the plenum chamber openings 14 in a matter of a few seconds, since the mass of the heat exchanger is small.

Now if it is assumed that the cycling thermostat 70 is set for a temperature of say 100 degrees, heater operation will continue at the maximum combustion rate until the temperature of the air arriving at the plenum chamber 12 is 100 degrees. At this point, thermostat 70 opens, thereby deenergizing the lead 112. This in turn deenergizes the fuel valve 64 and the primary 126 of the ignition transformer 128. The ignition is therefore turned off, and fuel ceases to flow to the nozzle 36 and combustion therefore is substantially instantaneously extinguished. It should be noted, however, that the ventilating air blower 24, the fuel pump 62, the combustion air blower 40, and the vibrating reed 118 continue in operation.

Since combustion has been extinguished, the temperature of the heat exchanger 30 will rapidly decrease until the air arriving at the cycling thermostat 70 is slightly below 100 degrees, at which point switch 70 will reclose. This immediately energizes the lead 112, the primary 126 of the ignition transformer, and the fuel valve 64. The ignition and the fuel are therefore turned on simultaneously and combustion is reestablished ordinarily within a small fraction of a second. This on-off cycle repeats itself endlessly until the heater is turned off by opening the switch 92 or the engine ignition switch 80. When either switch is opened the entire electrical system for the heater will be deenergized including the motors 26 and 66 and the relay coil 100. Opening switch 92 will not affect operation of the defroster blower motor 22, however, which is under the control of switch 90, since unheated defroster air is sometimes useful.

If the blower motor 26 is operating at a higher rate of speed than is necessary, which is likely to be true in mild weather, switch blade 92 can be shifted to contact 102 thereby putting the resistor 104 in series with the ventilating air blower motor 26. This does not affect operation of the relay coil 100, but does reduce the ventilating air rate. The heater continues in operation as before excepting that since less ventilating air is being supplied the "on" cycles of the burner will be shorter than previously and the "off" cycles will be somewhat longer. The temperature of the air arriving at the plenum chamber, however, cannot substantially exceed that at which the thermostat 70 is set, because whenever the thermostat 70 is open it is impossible for the burner to remain in operation.

At any time it is desired to supply heated defrosting air to the windshield, switch 90 is closed, thereby energizing motor 22. This causes the blower 18 to withdraw a portion of the warm air from the plenum chamber 12 and pass it through the ducts to the defroster outlets 20. The heating capacity of the heater should of course be sufficient to supply hot air both for space heating and for defrosting simultaneously.

The ventilating air blower motor 26 and the defroster motor 22 ordinarily will be supplied in the vehicle for use with a hot water heating system, and usually will be wired as shown so that they are deenergized when the ignition switch 80 is opened. It can be assumed, therefore, that the ignition switch 80 has been designed to handle a load of this magnitude. All of the equipment added to the system by the present invention, however, is energized directly from the battery with the exception of the relay coil 100, thereby obviating any danger of overloading the ignition switch 80.

Continuous operation of the motor 66 which supplies combustion air and drives the pump 62 has the advantage of making fuel and combustion air instantly available at the burner without there being any necessity for the motor to come up to speed at the beginning of each "on" cycle. There is an additional advantage in that since the motor 66 is not cycled on and off with the fuel valve 64 and transformer 26, the electrical load on the contacts of the cycling thermostatic switch 70 is much less. Continuous operation of the vibrating mechanism for interrupting the transformer primary circuit insures instant sparking at the spark plug at the beginning of each "on" cycle without waiting for the vibration of the reed 118 to stabilize.

It will be noted that the ignition transformer is deenergized whenever the fuel valve is closed, and is reenergized at the beginning of each "on" cycle. There is an important advantage associated with this arrangement in that such operation greatly reduces the tendency of the spark ignition system to interfere with the operation of any radio equipment which may be present in the vehicle. Sparking at the heater spark plug during the "off" cycles would produce noise in the radio receiving equipment, unless fairly elaborate arrangements were provided for preventing this. It has been found, however, that during burner operation the atmosphere at the spark plug gap is so highly ionized due to combustion that the resistance of the sparking gap is quite low and therefore substantially no radio interference is produced by the ignition system while the burner is in operation. By the expedient, therefore, of turning off the ignition whenever the fuel supply to the nozzle is interrupted, the ignition system is not on during the only portion of the cycle when it is capable of producing any substantial interference with the operation of the car radio. It is therefore unnecessary to provide elaborate filter circuits and shielding to insure satisfactory radio operation. A considerable reduction in expense and complexity which would otherwise be associated with a heating system of this type is thus avoided.

Inasmuch as the spacing and the duration of the on-off cycles for the burner are determined solely by the temperature of the air at the thermostat 70, this in turn being determined principally by the heat output of the burner on the one hand and the rate of ventilating air flow and its inlet temperature on the other hand, it will be seen that the heater is comparatively insensitive to the rate of ventilating air flow. In fact it has been found that with a heating system of this character having a very high output (of the order of 35,000 B.t.u. per hour), the heater burner will cycle normally on most automobile heater installations designed originally for use with hot water heaters even though the fan motor 26 is deenergized, if the automobile is moving. In other words, there will be sufficient air flow through the system due to the ramming effect alone at the ventilating air duct inlet to prevent the heat exchanger temperature from rising to a level at which the safety overheat switch operates. This feature is a great advantage in a system of this character, since it makes it possible for an automobile manufacturer to design a heating system of the hot water type for the automobile and then to offer the necessary elements to convert the system to a combustion heater system without the necessity for revising the ventilating air duct work. Automobiles, therefore, can be supplied by the factor with the ventilating air duct work installed, including the ventilating air blower and defroster system, and then the dealer at the customer's option can complete the heating system by installing either a hot water core and its water connections or the mechanism as described above.

By placing the fuel valve 64 physically as close to the nozzle 36 as is feasible, very little reservoir for fuel is provided in the fuel system upstream of the valve. Whenever the valve is closed, therefore, fuel spray from the nozzle stops immediately and fuel does not continue to dribble from the nozzle for a considerable period as normally occurs when the valve is placed farther upstream. This is a great aid in preventing the formation of carbon deposits upon the nozzle which interfere with the spray pattern and require a servicing operation.

Since carbon deposits upon the nozzle accumulate very slowly with the described arrangement, it is possible to cycle the burner on and off rapidly without the necessity for servicing the heater more often than once every two or three years or so with normal operation.

Rapid cycling of the burner under the control of a simple infinitely adjustable thermostatic switch at 70 results in precise regulation of the heat output of the system at any desired temperature even though the burner is never required to operate under modulated conditions. It is either full on or full off. This is an important advantage, since it is, so far as I know, impossible to provide a modulating type burner which will operate throughout the wide heat output range necessary to give satisfactory performance in an automobile installation.

Inasmuch as the fuel valve is closed instantly upon opening the engine ignition switch 80 or the heater switch 92, and since no fuel flows thereafter, it is unnecessary to provide a purge cycle, particularly since the combustion blower will continue to supply some air as it is coasting to a stop which will complete the combustion of any residual fuel. It should be noted further that inasmuch as the heater is turned off by deenergizing and closing the fuel valve 64, there is no possibility of the engine pump 54 forcing fuel through into the heater as might otherwise happen if the burner were cycled on and off by starting and stopping the motor 66 rather than by opening and closing the fuel valve 64.

It is not neccessary that fuel be taken for the heating system from a point between the engine pump 54 and the carburetor 60. If desired, the fuel can be taken directly from the fuel tank or from any place in the fuel system between the fuel tank and the carburetor. It is convenient, however, to obtain the fuel from the place indicated and it has the advantage that it can be assumed that the system for feeding fuel to the engine carburetor has been carefully designed by the automobile manufacturer so as to avoid the probability of vapor collecting in the fuel line. Such vapor bubbles when they are present, ordinarily are found on the low pressure side of the engine driven pump 54, since downstream of the pump the pressure of three to five pounds per square inch usually prevents the possibility of vaporization in an ordinary automobile engine installation. Therefore, by extracting fuel at a place where it is already under a pressure of three to five pounds per square inch, from a fuel system which can be considered as being well engineered up to that point, the possibility of obtaining bubbles in the fuel line to the heater is obviated without resort to expensive engineering in conjunction with each different model of automobile with which it is desired to use heating equipment of the type described. The heating system, therefore, can be installed rather freely in almost any automobile of the modern type with assurance that it will operate satisfactorily.

If the user of this system wishes the ultimate in simplicity of operation, he may close switch 92—96 at the beginning of the cold weather season and set the thermostat 70 at a comfortable level. Thereafter the heating system will be turned on and off automatically whenever the engine ignition switch 80 is respectively turned on and off.

From the above description of a preferred embodiment of my invention it will be appreciated that variations from the structure shown may be made without departing from the spirit or scope of the invention and that the scope of the invention is to be measured by the scope of the following claims.

Having described my invention, what I claim is new and useful and desire to secure by Letters Patent of the United States is:

1. In a vehicle heating system, means forming a burner and heat exchanger, said heat exchanger having a gas passage connected to said burner to receive hot products of combustion therefrom, means forming an exhaust conduit also connected to said gas passage, said heat exchanger providing a ventilating air passage in heat exchange relation to said gas passage, a first blower means connected for delivering air to said ventilating air passage, hot air conduit means connected to said ventilating air passage to receive heated air therefrom, a manually adjustable thermostat positioned to be sensitive to the temperature of the air in said hot air conduit, a switch actuated by said thermostat, said burner having a nozzle positioned for delivering liquid fuel into said burner, a primary-secondary transformer type spark ignition system for said burner adapted to provide sparking therein when interrupted current is supplied to the primary circuit thereof, said primary circuit including a vibrating circuit making and breaking contact, means adapted when energized for vibrating said contact, means forming a fuel passage, pumping means connected to supply liquid fuel under pressure to said fuel passage, said fuel passage being connected to deliver fuel to said nozzle, an electrically actuated valve in said fuel passage between said pumping means and said nozzle, said valve being adapted to open when energized and to close when deenergized, a second blower means connected to supply air for combustion to said burner, a cycling electric circuit including said thermostat actuated switch connected for energizing said fuel valve and said ignition system primary circuit by way of said contact simultaneously whenever the temperature of said thermostat drops substantially below a preset temperature and for deenergizing said ignition system primary circuit and said fuel valve simultaneously whenever the temperature of said thermostat rises substantially above said preset temperature, a heater on-off switch, means for energizing said contact vibrating means and for operating said first and second blower means and said pumping means all continuously when said heater switch is in the "on" position, means for energizing said cycling electric circuit when said heater switch is in the "on" position, said manually adjustable thermostat being adapted to be set only to temperatures within the range of normal heater operation, a safety thermostatic switch adapted to be heated by said heat exchanger, said safety thermostatic switch being connected to deenergize said fuel valve if said safety thermostatic switch is heated to a certain temperature, said certain temperature being above the normal range of heater operation.

2. In a vehicle heating system, means forming a burner and heat exchanger, said heat exchanger having a gas passage connected to said burner to receive hot products of combusion therefrom, means forming an exhaust conduit also connected to said gas passage, said heat exchanger providing a ventilating air passage in heat exchange relation to said gas passage, a first blower means connected for delivering air to said ventilating air passage, hot air conduit means connected to said ventilating air passage to receive heated air therefrom, a manually adjustable thermostat positioned to be sensitive to the temperature of the air in said hot air conduit, a switch actuated by said thermostat, said burner having a nozzle positioned for delivering liquid fuel into said burner, a spark ignition transformer for said burner adapted to provide substantially continuous sparking therein whenever said ignition transformer is energized, an interrupter circuit for said transformer, means forming a fuel passage, pumping means connected to supply liquid fuel under pressure to said fuel passage, said fuel passage being connected to deliver fuel to said nozzle, an electrically actuated valve in said fuel passage between said pumping means and said nozzle positioned immediately adjacent to said nozzle, said valve being adapted to open when energized and to close when deenergized, a second blower means connected to supply air for combustion to said burner, a cycling electric circuit including said thermostat actuated switch connected for energizing said fuel valve and said ignition transformer interrupter circuit simultaneously whenever the temperature of said thermostat drops substantially below a preset temperature and for deenergizing said ignition transformer interrupter circuit and said fuel valve simultaneously whenever the temperature of said thermostat rises substantially above said preset temperature, means for operating said first and second blower means and said pumping means continuously during operation of said heating system, means for energizing said cycling electric circuit and for operating the interrupter in said interrupter circuit continuously during operation of said heating system, said manually adjustable thermostat being adapted to be set only to temperatures within the range of normal heater operation, a safety thermostatic switch adapted to be heated by said heat exchanger, said safety thermostatic switch being connected to deenergize said fuel valve if said safety thermostatic switch is heated to a certain temperature, said certain temperature being above the normal range of heater operation.

3. In a vehicle heating system, means forming a burner and heat exchanger, said heat exchanger having a gas passage connected to said burner to receive hot products of combustion therefrom, means forming an exhaust conduit also connected to said gas passage, said heat exchanger providing a ventilating air passage in heat exchange relation to said gas passage, a first blower means connected for delivering air to said ventilating air passage, hot air conduit means connected to said ventilating air passage to receive heated air therefrom, a manually adjustable thermostat positioned to be sensitive to the temperature of the air in said hot air conduit, a switch actuated by said thermostat, said burner having a nozzle positioned for delivering liquid fuel into said burner, a primary-secondary type spark ignition system for said burner adapted to provide sparking therein when interrupted current is supplied to the primary circuit thereof, said primary circuit including a vibrating circuit making and breaking contact, means adapted when energized for vibrating said contact, means forming a fuel passage, pumping means connected to supply liquid fuel under pressure to said fuel passage, said fuel passage being connected to deliver fuel to said nozzle, an electrically actuated valve in said fuel passage between said pumping means and said nozzle positioned immediately adjacent to said nozzle, said valve being adapted to open when energized and to close when deenergized, a second blower means connected to supply air for combustion to said burner, a cycling electric circuit including said thermostat actuated switch connected for energizing said fuel valve and said ignition system primary circuit simultaneously whenever the temperature of said thermostat drops substantially below a preset temperature and for deenergizing said ignition system primary circuit and said fuel valve simultaneously whenever the temperature of said thermostat rises substantially above said preset temperature, a heater on-off switch, circuit means including branches for energizing said contact vibrating means and said cycling electric circuit and for operating said first and second blower means and said pumping means all continuously when said heater switch is in the "on" position, said manually adjustable thermostat being adapted to be set only to temperatures within the range of normal heater operation, a safety thermostatic switch adapted to be heated by said heat exchanger, said safety thermostatic switch being connected to deenergize said fuel valve if said safety thermostatic switch is heated to a certain temperature, said certain temperature being above the normal range of heater operation.

4. In a vehicle heating system, means forming a burner and a heat exchanger, said heat exchanger having a gas passage connected to said burner to receive hot products of combustion therefrom, means forming an exhaust conduit also connected to said gas passage, said heat exchanger providing an air passage in heat exchange relation to said gas passage, means for delivering air to said air passage, hot air conduit means connected to said air passage to receive heated air therefrom, thermostatic switch means positioned to be responsive to the temperature of the air in said hot air conduit, said burner having a nozzle positioned for delivering liquid fuel into said burner, a spark ignition system including circuit interrupter means for said burner adapted to provide sparking therein, means forming a fuel passage connected to said nozzle, pumping means connected to supply liquid fuel under pressure to said fuel passage and to said nozzle, an electrically controlled valve in said fuel passage between said pumping means and said nozzle, said valve being adapted to open when energized and to close when deenergized, blower means connected to supply air for combustion to said burner, a cycling electric circuit including said thermostatic switch means connected for energizing said fuel valve and said ignition system whenever the temperature of the air in said hot air conduit drops below a predetermined value and for deenergizing said fuel valve and said ignition system whenever the temperature of the air in said hot air conduit rises substantially above said predetermined temperature, a heater on-off switch, and circuit means including branches for operating said circuit interrupter means in said cycling electric circuit and for operating said blower means continuously when said heater switch is in the "on" position.

5. In a vehicle heating system, means forming a burner and a heat exchanger, said heat exchanger having a gas passage connected to said burner to receive hot products of combustion therefrom, means forming an exhaust conduit also connected to said gas passage, said heat exchanger providing an air passage in heat exchange relation to said gas passage, means for delivering air to said air passage, hot air conduit means connected to said air passage to receive heated air therefrom, thermostatic switch means positioned to be responsive to the temperature of the air in said hot air conduit, said burner having a nozzle positioned for delivering liquid fuel into said burner, a spark ignition system for said burner adapted to provide sparking therein, said spark ignition system including a circuit having an interrupter therein, means forming a fuel passage connected to said nozzle, pumping means connected to supply liquid fuel under pressure to said fuel passage and to said nozzle, a valve in said fuel passage between said pumping means and said nozzle, said valve being adapted to open when actuated and to close when deactuated, blower means connected to supply air for combustion to said burner, a cycling electric circuit including said thermostatic switch means connected for actuating said fuel valve and energizing said ignition system circuit whenever the temperature of the air in said hot air conduit drops below a predetermined value and for deactuating said fuel valve and deenergizing said ignition system circuit whenever the temperature of the air in said hot air conduit rises substantially above said predetermined temperature, a heater on-off switch, and circuit means including branches for operating said circuit interrupter and said blower means continuously when said heater switch is in the "on" position.

References Cited in the file of this patent
UNITED STATES PATENTS

| | | |
|---|---|---|
| 2,263,098 | Mueller | Nov. 18, 1941 |
| 2,308,887 | McCollum | Jan. 19, 1943 |
| 2,308,888 | McCollum | Jan. 19, 1943 |
| 2,473,372 | Hess et al. | June 14, 1949 |
| 2,482,565 | Tramontini | Sept. 20, 1949 |
| 2,582,827 | Gibson | Jan. 15, 1952 |
| 2,588,349 | Dusek et al. | Mar. 11, 1952 |
| 2,596,290 | Ryder et al. | May 13, 1952 |

FOREIGN PATENTS

| | | |
|---|---|---|
| 474,065 | Canada | May 29, 1951 |